United States Patent
Fabian et al.

(10) Patent No.: US 8,973,407 B2
(45) Date of Patent: *Mar. 10, 2015

(54) METHOD FOR PRODUCING SYNTHETIC QUARTZ GLASS

(71) Applicant: Heraeus Quarzglas GmbH & Co. KG, Hanau (DE)

(72) Inventors: Heinz Fabian, Grossostheim (DE); Juergen Roeper, Sandersdorf-Brehna (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,363

(22) Filed: Nov. 23, 2012

(65) Prior Publication Data

US 2013/0133375 A1   May 30, 2013

Related U.S. Application Data

(60) Provisional application No. 61/569,083, filed on Dec. 9, 2011.

(30) Foreign Application Priority Data

Nov. 25, 2011 (DE) .......................... 10 2011 119 374

(51) Int. Cl.
  *C03B 37/018* (2006.01)
  *C03B 37/014* (2006.01)
  *C03B 19/14* (2006.01)

(52) U.S. Cl.
  CPC ......... *C03B 37/018* (2013.01); *C03B 37/01413* (2013.01); *C03B 19/1415* (2013.01); *C03B 2207/32* (2013.01); *C03B 2207/85* (2013.01)
  USPC ................ 65/421; 65/413; 427/167; 118/726

(58) Field of Classification Search
  None
  See application file for complete search history.

(56) References Cited

U.S. PATENT DOCUMENTS

| 2,552,247 A | 5/1951 | Wormuth et al. |
| 3,274,154 A | 9/1966 | Kendrick et al. |

(Continued)

FOREIGN PATENT DOCUMENTS

| DE | 2435704 | 2/1976 |
| DE | 2435704 A1 | 2/1976 |

(Continued)

OTHER PUBLICATIONS

Espacenet English language abstract of DE 102007024725 A1, published Nov. 27, 2008.

(Continued)

*Primary Examiner* — Lisa Herring
(74) *Attorney, Agent, or Firm* — Tiajoloff & Kelly LLP (57) ABSTRACT

A method for producing synthetic quartz glass comprises providing a liquid $SiO_2$ feedstock material containing mainly octamethylcyclotetrasiloxane D4, vaporizing the $SiO_2$ feedstock material into a feedstock vapor, converting the feedstock vapor into $SiO_2$ particles, depositing the $SiO_2$ particles on a deposition surface while forming a porous $SiO_2$ soot body, and vitrifying the $SiO_2$ soot body while forming the synthetic quartz glass. To produce large-volume cylindrical soot bodies with outer diameters of more than 300 mm of improved material homogeneity, the liquid feedstock material contains additional components comprising hexamethylcyclotrisiloxane D3 and its linear homolog with a weight fraction mD3, dodecamethylcyclohexasiloxane D6 and its linear homolog with a weight fraction mD6, and tetradecamethylcycloheptasiloxane D7 and/or hexadecamethylcyclooctasiloxane D8 and its linear homologs with a weight fraction mD7+. The weight ratio mD3/mD6 is in a range between 0.5 and 500 and the weight fraction mD7+ is at least 20 wt. ppm.

31 Claims, 5 Drawing Sheets

(56) References Cited

U.S. PATENT DOCUMENTS

| | | | |
|---|---|---|---|
| 3,332,974 A | 7/1967 | Bostick | |
| 3,493,533 A | 2/1970 | Bailey et al. | |
| 3,629,309 A | 12/1971 | Bailey et al. | |
| 3,903,047 A | 9/1975 | Ashby | |
| 3,978,104 A | 8/1976 | Razzano | |
| 3,998,865 A | 12/1976 | Siciliano et al. | |
| 4,022,152 A | 5/1977 | Laufer et al. | |
| 4,096,160 A | 6/1978 | Ashby | |
| 4,158,092 A | 6/1979 | Botsch et al. | |
| 4,220,460 A | 9/1980 | Partus | |
| 4,556,726 A * | 12/1985 | Reedy et al. | 556/460 |
| 4,563,513 A | 1/1986 | Inomata | |
| RE32,107 E | 4/1986 | January | |
| 4,613,380 A | 9/1986 | Chen | |
| 4,704,271 A | 11/1987 | Hourihan et al. | |
| 4,720,353 A | 1/1988 | Bell | |
| 4,824,985 A | 4/1989 | Goodwin et al. | |
| 4,847,069 A | 7/1989 | Bissett et al. | |
| 4,847,071 A | 7/1989 | Bissett et al. | |
| 4,847,072 A | 7/1989 | Bissett et al. | |
| 4,869,897 A | 9/1989 | Chatterjee et al. | |
| 4,889,845 A | 12/1989 | Ritter et al. | |
| 4,892,890 A | 1/1990 | Damani | |
| 4,946,671 A | 8/1990 | Bissett et al. | |
| 4,948,578 A | 8/1990 | Burger et al. | |
| 4,954,332 A | 9/1990 | Bissett et al. | |
| 4,954,335 A | 9/1990 | Janchipraponvej | |
| 4,961,753 A | 10/1990 | Donkers et al. | |
| 5,021,221 A | 6/1991 | Gould et al. | |
| 5,039,513 A | 8/1991 | Chatterjee et al. | |
| 5,043,002 A * | 8/1991 | Dobbins et al. | 65/386 |
| 5,049,617 A | 9/1991 | Yoshioka et al. | |
| 5,143,661 A | 9/1992 | Lawter et al. | |
| 5,152,819 A * | 10/1992 | Blackwell et al. | 65/386 |
| 5,154,744 A | 10/1992 | Blackwell et al. | |
| 5,210,129 A | 5/1993 | de la Croi Habimana et al. | |
| 5,211,732 A * | 5/1993 | Abbott et al. | 65/421 |
| 5,232,689 A | 8/1993 | Katsoulis et al. | |
| 5,250,278 A | 10/1993 | Schuette et al. | |
| 5,270,036 A | 12/1993 | Varaprath et al. | |
| 5,275,761 A | 1/1994 | Bergmann | |
| 5,279,818 A | 1/1994 | Halloran et al. | |
| 5,292,530 A | 3/1994 | McCrea et al. | |
| 5,300,285 A | 4/1994 | Halloran et al. | |
| 5,302,382 A | 4/1994 | Kasprzak | |
| 5,308,551 A | 5/1994 | Beauquey et al. | |
| 5,326,557 A | 7/1994 | Glover et al. | |
| 5,330,747 A | 7/1994 | Krzysik | |
| 5,338,535 A | 8/1994 | Berndt | |
| 5,356,451 A | 10/1994 | Cain et al. | |
| 5,358,667 A | 10/1994 | Bergmann | |
| 5,391,674 A | 2/1995 | Hara et al. | |
| 5,399,649 A | 3/1995 | Okawa | |
| 5,403,402 A | 4/1995 | LeGrow | |
| 5,426,168 A | 6/1995 | Witucki | |
| 5,443,607 A | 8/1995 | Englisch et al. | |
| 5,473,037 A | 12/1995 | Itoh et al. | |
| 5,508,369 A | 4/1996 | Yamazaki et al. | |
| 5,562,945 A | 10/1996 | Hijino et al. | |
| 5,632,797 A | 5/1997 | Williams | |
| 5,703,191 A | 12/1997 | Henderson et al. | |
| 5,735,921 A | 4/1998 | Araujo et al. | |
| 5,735,928 A | 4/1998 | Sayce et al. | |
| 5,790,315 A | 8/1998 | Fujinoki et al. | |
| 5,879,649 A | 3/1999 | Henderson et al. | |
| 5,938,853 A * | 8/1999 | Williams | 118/726 |
| 5,970,746 A | 10/1999 | Fujinoki et al. | |
| 6,152,166 A | 11/2000 | Bauscher et al. | |
| 6,209,354 B1 | 4/2001 | Fujinoki et al. | |
| 6,672,106 B1 * | 1/2004 | Hawtof et al. | 65/17.2 |
| 6,982,232 B2 | 1/2006 | Borrelli et al. | |
| 7,506,521 B2 | 3/2009 | Bookbinder et al. | |
| 7,506,522 B2 | 3/2009 | Bleaking et al. | |
| 7,534,733 B2 | 5/2009 | Bookbinder et al. | |
| 7,589,039 B2 | 9/2009 | Allan et al. | |
| 8,245,543 B2 | 8/2012 | Huenermann | |
| 2001/0020448 A1 * | 9/2001 | Vaartstra et al. | 118/724 |
| 2003/0116091 A1 * | 6/2003 | Grant et al. | 118/726 |
| 2006/0107693 A1 | 5/2006 | Trommer et al. | |
| 2010/0132406 A1 | 6/2010 | Huenermann | |
| 2010/0276291 A1 | 11/2010 | Durrer et al. | |
| 2012/0276291 A1 * | 11/2012 | Bird et al. | 427/248.1 |

FOREIGN PATENT DOCUMENTS

| | | |
|---|---|---|
| DE | 3500080 A1 | 7/1986 |
| DE | 4029071 A1 | 3/1992 |
| DE | 4204406 A1 | 8/1993 |
| DE | 195 01 733 C1 | 5/1996 |
| DE | 19501733 A1 | 5/1996 |
| DE | 10302914 A1 | 8/2004 |
| DE | 102007024725 A1 | 11/2008 |
| EP | 463045 | 1/1992 |
| EP | 463045 A1 | 1/1992 |
| EP | 0622452 A1 | 4/1994 |
| EP | 0622452 A1 | 11/1994 |
| EP | 673888 A1 | 3/1995 |
| EP | 673888 A1 | 9/1995 |
| EP | 908418 A1 | 3/1999 |
| EP | 908418 A1 | 4/1999 |
| EP | 1329429 | 7/2003 |
| JP | 6-292868 | 10/1994 |
| JP | 2744695 B2 * | 4/1998 |
| WO | 9010596 A1 | 9/1990 |
| WO | 2004065314 A1 | 8/2004 |

OTHER PUBLICATIONS

Espacenet English language abstract of DE 4204406 A1, published Aug. 26, 1993.
Espacenet English language abstract of DE 10302914 A1, published Aug. 12, 2004.
Espacenet English language abstract of DE 3500080 A1, published Jul. 10, 1986.
Dow Corning(R) 244 Fluid (German Language edition), version 3.10, updated Jul. 2, 2008.
"Information about Volatile Silicone Fluids", Dow Corning Corporation, 1982.
Dow Corning(R) 244 Fluid Material Safety Data Sheet, version 2.6, updated Jul. 13, 2007.
English Translation of JP 6-292868, submitted Sep. 2014.
Espacenet English language abstract of DE 4204406 A1 published Aug. 26, 1993.
Espacenet English language abstract of DE 19501733 A1 published May 15, 1995.

* cited by examiner

METHOD FOR PRODUCING SYNTHETIC QUARTZ GLASS

RELATED APPLICATIONS

This application claims the benefit of U.S. provisional application Ser. No. 61/569,083 filed Dec. 9, 2011, which is herein incorporated in its entirety by reference.

FIELD OF THE INVENTION

The present invention relates to a method for producing synthetic quartz glass, the method comprising the steps of:
(a) providing a liquid $SiO_2$ feedstock material, which contains octamethylcyclotetrasiloxane D4 as the main component,
(b) vaporizing the $SiO_2$ feedstock material into a feedstock material vapor,
(c) converting the feedstock material vapor into $SiO_2$ particles,
(d) depositing the $SiO_2$ particles on a deposition surface while forming a porous $SiO_2$ soot body,
(e) vitrifying the $SiO_2$ soot body while forming the synthetic quartz glass.

PRIOR ART

For the production of synthetic quartz glass for commercial applications, $SiO_2$ particles are produced from a silicon-containing start substance in a CVD method (chemical gas phase deposition) by hydrolysis and/or oxidation and said particles are deposited on a carrier. A distinction can here be made between outside deposition methods and inside deposition methods. In the outside deposition methods $SiO_2$ particles are applied to the outside of a rotating carrier. Examples to be mentioned here are the so-called OVD (outside vapor phase deposition) method, the VAD (vapor phase axial deposition) method or the PECVD (plasma enhanced chemical vapor deposition) method. The best known example of an inside deposition method is the MCVD (modified chemical vapor deposition) method in which $SiO_2$ particles are deposited on the inner wall of an externally heated tube.

At a sufficiently high temperature in the area of the carrier surface the $SiO_2$ particles are directly vitrified ("direct vitrification"). An example thereof is the "boule production" described in U.S. Pat. No. 5,043,002. $SiO_2$ particles are here deposited by means of deposition burners, which are directed from above into a rotating mold, and are directly vitrified so that a quartz glass body ("boule") is vertically built up from the bottom to the top in said mold.

By contrast, in the so-called "soot method" the temperature during the deposition of the $SiO_2$ particles is so low that a porous soot layer is obtained that is sintered in a separate method step into transparent quartz glass. An example thereof is the OVD method known from DE 10 2007 024 725 A1, in which a deposition burner is fed with combustion gases in the form of hydrogen and oxygen and with a silicon-containing start compound which is converted in a burner flame assigned to the deposition burner into $SiO_2$ particles which are deposited layer by layer with formation of a $SiO_2$ blank while the deposition burner is reversingly moving along a carrier rotating about its longitudinal axis.

In a modification of the soot method which aims at higher productivity, a plurality of deposition burners are used instead of only one deposition burner, the plural deposition burners being reversingly reciprocated for soot deposition in a joint row of burners along the rotating carrier. Each of the burner flames only sweeps over a sub-length of the carrier in this process, whereby inhomogeneities may arise in the $SiO_2$ soot structure at the turning points of the burner movement.

In the final analysis, both direct vitrification and soot method yield a dense, transparent synthetic quartz glass of high purity.

The formation of layer structures is inherent to said production methods on account of the layerwise deposition of $SiO_2$ particles. These may be noticed as so-called striae that hint at differences in the refractive indices between neighboring layers. As a rule, a distinction can be made between cylindrical $SiO_2$ blanks with a concentric layer structure and those with an axial layer structure. In the OVD method a layer structure is e.g. produced with a spiral layer extending substantially concentrically with respect to the longitudinal axis of the blank in that $SiO_2$ particles are deposited layer by layer on the cylinder outer surface of the carrier rotating about its longitudinal axis. By contrast, in the VAD method in which a $SiO_2$ solid cylinder is built up in the direction of the longitudinal axis of the cylinder on a disc-shaped rotating carrier by axial deposition, a helical layer structure is usually obtained with axially successive layers extending in a direction perpendicular to the longitudinal axis of the cylinder.

High demands are made on the homogeneity of the refractive indices in the case of synthetic quartz glass used in microlithography or for optical components in communications engineering. Therefore, for the elimination of layers in quartz glass cylinders, multi-step deformation processes have been suggested, for instance in DE 42 04 406 A1 and EP 673 888 A1, which describes a tool-free method for homogenizing quartz glass bodies subject to striae by multidimensional compression and elongation of a softened quartz glass mass. These methods are efficient, but time-consuming and cost-intensive.

In the past silicon tetrachloride ($SiCl_4$) turned out to be useful as the silicon-containing feedstock material. $SiCl_4$ and other chlorine-containing substances already exhibit high vapor pressures at moderate temperatures below 100° C., so that possible impurities remain in the liquid phase and the manufacture of high-purity soot bodies is facilitated. On the other hand, hydrochloric acid which causes high costs in terms of flue gas scrubbing and disposal is formed during the reaction of $SiCl_4$ and other chlorine-containing feedstock materials.

Therefore, a multitude of chlorine-free feedstock materials have been tested for quartz glass production. Monosilanes, alkoxysilanes and siloxanes should be mentioned as examples. A particularly interesting group of chlorine-free feedstock materials is formed by the polyalkylsiloxanes (also shortly "siloxanes"), which are e.g. known from EP 463 045 A1. The substance group of siloxanes can be subdivided into open-chain and closed-chain polyalkylsiloxanes. The polyalkylsiloxanes have the general sum formula $Si_pO_p(R)_{2P}$, where P is an integer $\geq 2$. The residue "R" is an alkyl group, in the simplest case a methyl group.

Polyalkylsiloxanes are distinguished by a particularly high content of silicon per weight fraction, which contributes to the economy of their use in the manufacture of synthetic quartz glass. At the moment octamethylcyclotetrasiloxane (OMCTS) is preferably used because of its large-scale availability in a high purity. This substance is also designated as "D4" according to a notation introduced by General Electric Inc., where "D" represents the group $[(CH_3)_2Si]$-0-.

However, on account of the relatively high boiling temperature and the chemical similarity with other polyalkylcyclosiloxanes, such as hexamethylcyclotrisiloxane (D3), decamethylcyclopentasiloxane (D5), dodecamethylcyclohexasiloxane (D6) and tetradecamethylcycloheptasiloxane (D7), the purification of D4 requires a time-consuming and expensive distillation procedure.

U.S. Pat. No. 5,879,649 A is concerned with such a purification of polyalkylsiloxanes as feedstock material for quartz glass production. The publication suggests a two-step distillation process using a carbon filter and a molecular sieve to limit the amount of impurities with boiling temperatures above 250° C. to an amount of less than 14 wt. ppm, preferably to less than 2 wt. ppm. Typically, these high-boiling impurities are components having a mean molecular weight of more than 500 g/mole. It is reported that agglomerates of such high-boiling impurities lead to clogging in the gas supply system and effect "gel formation", thereby producing defects in the quartz glass. The defect mechanism seems here to be the deposition of undecomposed or incompletely decomposed high-boiling agglomerates that will subsequently decompose with release of gases and may lead to bubbles in the quartz glass.

The suggested two-step purifying method is complicated and expensive, and it has been found that, even in the case of an optimized process control, material inhomogeneities arise particularly in the form of thin layers of increased density in the quartz glass.

As an alternative thereto, DE 103 02 914 A1 suggests for the production of synthetic quartz glass with a favorable damaging behavior towards short-wave UV radiation that a mixture of $SiCl_4$ and of an oligomeric silicon compound containing plural Si atoms, such as e.g. a siloxane, should be used as the feedstock material.

The silicon-containing feedstock material can be supplied in liquid form to the consumer, such as e.g. a deposition burner. As a rule, however, the liquid feedstock material is converted by means of a vaporizer into a gaseous or vaporous phase and supplied to the consumer as a continuous gas stream.

A large number of vaporizers are known. A known vaporizer includes a container (a so-called "bubbler") in which the liquid feedstock material is kept and heated by means of a heater to a temperature around the vaporization temperature. A carrier gas is passed through the heated liquid and loaded in this process with the vaporizing feedstock material and supplied under pressure via a pipe system to the reaction zone. The carrier gas is e.g. oxygen. Such a supply of media to a deposition burner for producing synthetic quartz glass by direct vitrification is e.g. described in EP 908 418 A1.

The vaporization rate of the feedstock material depends substantially on the temperature and the residence period of the carrier gas in the liquid phase. Both parameters are influenced by the height of the liquid column and by the supply rate and the flow velocity of the carrier gas. For instance, the size of the carrier gas bubbles in the liquid column has impacts on their rate of ascent in the liquid and thus on the loading with the feedstock material and on the vaporization rate. Changes in the liquid amount have also an impact on the heat transfer. These complex interactions can be handled in the easiest way in that liquid feedstock material is constantly delivered so that the liquid level in the bubbler will not decline.

However, even at a constant liquid level, impurities of a relatively higher boiling point may gradually enrich in the liquid phase with formation of a "sump", so that the composition of the feedstock material arriving at the deposition burner will change over time.

An additional problem will arise in soot deposition methods in which several consumers have to be simultaneously fed with the feedstock material, e.g. in the case of a soot deposition with a multiple burner assembly. To avoid an irregular soot deposition and layer formation, it is here particularly important that each deposition burner has the same soot build-up characteristics in terms of quantity and quality. Variations in the gas supply of the individual deposition burners can be minimized in that these are fed from a common feed tank via a "flow distributor", as is e.g. described in DE 195 01 733 A1. This, however, requires a complicated infrastructure of the media supply.

Another type of vaporizer, as is e.g. described in U.S. Pat. No. 5,356,451 A1 avoids the above-mentioned "sump formation". In this vaporizer a liquid reservoir for the feedstock material is provided inside a vaporization chamber, said reservoir extending along a longitudinal side of the chamber and being filled continuously. If the liquid level exceeds a predetermined overflow height, the liquid will flow off via U-shaped channels out of the storage chamber on the long side towards an inclined plane, thereby forming a thin film thereon. The chamber is heated such that the liquid film on the inclined plane will completely vaporize before the lower end of the inclined plane is reached. It is thereby ensured that the whole liquid, including all impurities, will vaporize at a higher boiling point.

An embodiment of a so-called vertical vaporizer is known from DE 24 35 704 A1. It is suggested therein that the liquid to be vaporized should be heated, supplied to a vertically standing rotation-symmetrical container and sprayed radially against the inner wall of the container with formation of droplets having a diameter of less than 5 mm and that these droplets should be deposited at said place. The vaporous products are removed upwards while the non-vaporized liquid collects in the lower part of the container where it can be removed continuously or from time to time.

The known method works like an additional distillation step during vaporization, wherein constituents of low volatility can be removed via the sump. This results in a higher purity of the vaporized portion of the feedstock material. Yield and throughput are however comparatively low.

Technical Objective

In general, the structure of a $SiO_2$ soot body is sufficiently gas-permeable, which facilitates a uniform gas-phase treatment or sintering. In the area of layers of increased density, this is only possible to a limited degree. The reason is that the layers represent diffusion barriers which may produce a non-uniform treatment result in drying or sintering processes. These problems arise because of long diffusion paths, especially with large-volume $SiO_2$ soot bodies. Layer areas can particularly be accompanied by a locally increased content of hydroxyl groups and possibly of chlorine.

These inhomogeneities in the material of the soot body manifest themselves in the quartz glass body made therefrom, e.g. in the form of axial, radial or azimuthal variations of the hydroxyl-group or chlorine concentration or the viscosity values, and lead to unfavorable properties in the end product, such as e.g. an unfavorable damaging behavior with respect to radiation with high-energy UV light.

It is the object of the present invention to provide a method for producing $SiO_2$ soot bodies of high material homogeneity, particularly large-volume cylindrical soot bodies with outer diameters of more than 300 mm.

General Description of the Invention

This object, starting from the aforementioned method, is achieved according to the invention in that the liquid feedstock material contains additional components comprising hexamethylcyclotrisiloxane D3 and the linear homolog thereof with a weight fraction mD3, decamethylcyclohexasiloxane D6 and the linear homolog thereof with a weight fraction mD6, and tetradecamethylcycloheptasiloxane D7 and/or hexadecamethylcyclooctasiloxane D8 and the linear homologs thereof with a weight fraction mD7+, wherein the weight ratio mD3/mD6 is in a range between 0.5 and 500 and the weight fraction mD7+ is at least 20 wt. ppm.

In contrast to the known methods in which a feedstock material is used that consists of a single defined silicon compound of the highest purity possible, the present invention suggests a $SiO_2$ feedstock material that is present as a mixture of different polyalkylsiloxanes. Octamethylcyclotetrasiloxane will here and in the following be called D4 in short, and other polyalkylcyclosiloxanes are consequently called D3, D5, D6, D7 and D8. D4 forms the main component of the mixture. In addition to D4, the mixture contains chemically similar polyalkylsiloxanes, namely those with a smaller molecular mass than D4 (including D3) and also those with a greater molecular mass than D4 (including D6 and D7). Thus the additional constituents of the feedstock material which are summarized under the term "additional components" have molecular masses and boiling temperatures that differ both upwards and downwards from the relative molecular mass of D4 (about 297 g/mol) and in the boiling temperature of D4 (about 175° C.).

The liquid $SiO_2$ feedstock material which is enriched with additional components is supplied to a reaction zone in gaseous form and is decomposed in this process by oxidation and/or hydrolysis and/or pyrolysis into $SiO_2$. The reaction zone is e.g. a burner flame or plasma. In the reaction zone the polyalkylsiloxane molecule is oxidatively decomposed step by step into $SiO_2$, resulting in a $SiO_2$ primary particle to which other SiO— or $SiO_2$ molecules from the gas phase are attached. The attachment process will end on the way through the reaction zone towards a deposition surface as soon as the agglomerated or aggregated $SiO_2$ particles enter into a zone in which there are no longer any other undecomposed molecules available.

These separation, oxidation and attachment processes (hereinafter also summarized under the term "particle formation process") take place with different kinetics and at different temperatures, depending on the molecular mass and size of the polyalkylsiloxane molecule.

In the method of the invention the $SiO_2$ feedstock material contains at least one additional component with a smaller relative molecular mass than D4 and also at least one additional component with a greater relative molecular mass than D4. It is assumed that during the hydrolytic or pyrolytic decomposition of the polyalkylsiloxanes the activation energy of the oxidative attack or the thermal energy needed for separation is increasing with an increasing molecular mass. As a consequence, agglomerates and aggregates of different sizes with a broader particle size distribution than in monodisperse $SiO_2$ feedstock material are formed in the reaction zone.

A possible explanation for this broadening of the particle size distribution is that due to the different gas phase kinetics one also obtains different kinetics with respect to the formation of $SiO_2$ primary particles on which further growth can take place due to the attachment of further $SiO_2$ molecules from the gas phase. Another possible explanation is that already the number and configuration of the silicon atoms of the respective polyalkylsiloxane molecules predetermine the size of the $SiO_2$ primary particles and thus with this also the size of the $SiO_2$ particles evolving therefrom and their concentration in the reaction zone.

At any rate, in comparison with the use of pure D4, the additional components in the method according to the invention change the particle formation process towards a broader spectrum of the sizes of the evolving $SiO_2$ particles, accompanied by a change in the soot body structure.

Due to the manufacturing process soot bodies show a certain layer structure, the layers representing regions of local changes in the density or the chemical composition. Normally, soot bodies have a density of 25-32% based on the density of quartz glass. These soot bodies show a relative variation in the density of 3% to 4%. These density variations manifest themselves during vitrification of the soot body in the quartz glass body and lead there to radial, azimuthal and axial variations of the hydroxyl groups or chlorine concentrations which may lead to unfavorable properties of the quartz glass cylinder and the quartz glass fibers produced therefrom.

It has been found that the use of a $SiO_2$ feedstock material according to the invention yields a $SiO_2$ soot body with a surprisingly high homogeneity, particularly with a uniform and weak characteristic of the layer structure.

This effect can be ascribed to the fact that the broadening of the size distribution of the formed and depositing $SiO_2$ particles either leads to a more homogeneous deposition of the $SiO_2$ soot than in monodisperse $SiO_2$ particles or that it facilitates a more uniform densification of the $SiO_2$ soot during soot body production or during vitrification.

To achieve this effect, the following boundary conditions have to be met:
(a) The feedstock material arriving in the reaction zone must contain additional components with molecular masses at both sides of the reference molecular mass of D4, ideally D3 and D6 and D7 or the corresponding open-chain homologs.

The additional components D3 and D6 are molecules with a similar molecular mass and with a chemical similarity with respect to D4, resulting in a moderate change in the reaction zone and the particle formation process, accompanied by a minor flattening of the particle size distribution.

(b) A distribution of the additional components at both sides of D4 that is as uniform as possible. This condition will be satisfied to a sufficient degree if the ratio of mD3/mD6 is between 0.5 and 500.

A haphazardly mixed polyalkylsiloxane mixture with weight fractions of D3 and D6 outside said range yields poorer results with respect to the homogeneity of the soot body.

(c) A minimum amount of a polyalkylsiloxane boiling at an even higher temperature than D6, ideally D7 or the even longer-chained polyalkylsiloxane D8, with a weight fraction mD7+ of at least 20 wt. ppm in total (the term mD7 is hereinafter used for designating the weight fraction of D7, and the term mD7+ designates the sum of the weight fractions of D7 and D8 in the following).

The boiling point of D7 at atmospheric pressure is about 276° C. and thus clearly above the boiling point of D4 (about 175° C.). Due to the great difference in the respective boiling temperatures already small amounts of the additional component D7 have a noticeable impact on the particle formation process. At weight fractions mD7+ of less than 20 ppm, however, no significant effect can be detected. With the weight fraction mD7+ an amount of D7 may be replaced by a corresponding amount of D8. Due to their large molecular mass in comparison with D4, D8 and its linear homolog, however, bring about a noticeable change in the reaction zone and the particle formation process already at a low concentration, so that the weight fraction of D8 is preferably not more than 20 wt. ppm of the feedstock material.

The method according to the invention is distinguished in that the known density variations in the soot body are reduced. Since this reduction of the density variations has a direct effect on the quality of the quartz glass, more homogeneous quartz glass bodies of higher quality are thus obtained in a reproducible manner, which reduces material rejects.

With the help of the method according to the invention it is possible to obtain $SiO_2$ soot bodies and quartz glass bodies that exhibit a particularly high material homogeneity which exceeds the presently common standard. The advantages of the method can be explained in that a stronger variation, which takes place on a microscopic scale, in the sizes of the produced $SiO_2$ particles, viz. the broadening of the particle size distribution, results in a reduction of the variation width of the macroscopically measured density within the $SiO_2$ soot body.

Within the scope of the invention the term "weight fraction" describes a relative value that ensues from the mass of the respective additional component in relation to the total mass of the liquid $SiO_2$ feedstock material. The weight ratio mD3/mD6 of the two weight fractions of the additional components D3 and D6 is thus a dimensionless value that can be determined by division of the two relative weight fractions.

Within the scope of the invention the term polyalkylsiloxane comprises both linear (including also branched structures) and cyclic molecular structures. It is however preferred when the polyalkylsiloxanes of the $SiO_2$ feedstock material comprise at least three polymethylcyclosiloxanes, selected from the group consisting of hexamethylcyclotrisiloxane (D3), octamethylcyclotetrasiloxane (D4), dodecamethylcyclohexasiloxane (D6). The notation D3, D4, D6 derives from a notation introduced by General Electric Inc., wherein "D" represents the group $[(CH_3)_2Si]$-0-. The main component is D4 with a portion of at least 70% by wt., particularly at least 80% by wt., preferably at least 90% by wt., particularly preferably at least 94% by wt., each time based on the total weight of the feedstock material.

The liquid feedstock material can be produced by mixing the individual components or by blending component mixtures, or by premature removal from a distillation column or premature termination of a distillation, as is otherwise standard for the purification of octamethylcyclotetrasiloxane. Hence, in the method according to the invention the purification of octamethylcyclotetrasiloxane can be omitted and, instead of this, a less pure and thus also cheaper D4 quality can be used. The similar densities of the polyalkylsiloxanes of the feedstock material counteract a separation.

In a preferred configuration of the method, the ratio mD3/mD6 is in the range between 001 and 200.

It has been found that the addition of D3 and D6 to the $SiO_2$ feedstock material, which consists mainly of D4, in this comparatively small range of the mass ratio achieves a particularly significant reduction of the inhomogeneities in the density of the quartz glass mass.

In this context it has also turned out to be advantageous when the weight fraction mD7+ is in the range between 30 wt. ppm and 100 wt. ppm.

Apart from D6, D7 and D8, decamethylcyclopentasiloxane D5 and its linear homolog represent polyalkylsiloxanes of a higher molecular weight than D4. D5 is chemically very similar to the molecule D4, so that the effect of D5 with respect to the particle size broadening in the particle formation process and the accompanying equalization in the $SiO_2$ soot structure is smaller than that of D6, but it makes a supplementary contribution.

To enable the additional components to produce an optimal effect on the particle size broadening in the particle formation process and the equalization in the $SiO_2$ soot structure, a minimum amount of said components is advantageous. Therefore, it has turned out to be advantageous when the sum of the weight fractions mD3+mD6 is in the range between 200 wt. ppm and 20,000 wt.-ppm, preferably between 500 wt. ppm and 15,000 wt. ppm.

Surprisingly, it has been found that the additional components D3 and D6 need not dominate the $SiO_2$ feedstock material, but admixtures are enough for providing a $SiO_2$ feedstock material that during deposition in the $SiO_2$ soot method leads to a broadening of the $SiO_2$ particle size and thus to an enhanced homogeneity of the soot body. Particularly good results are achieved up to an upper limit of not more than 10% of the total weight. On the other hand, already small amounts of additional components D3 and D6 have the effect that density changes in the soot body are covered by different particle sizes of the $SiO_2$ feedstock vapor, so that a more homogeneous soot body or quartz glass body is obtained on the whole. At weight fractions of less than 200 wt. ppm of the additional components D3 and D6, the effect is however no longer significantly noticeable.

The activation energy needed for the decomposition is lower in the polyalkylsiloxane D3 than in D4, which might be due to the fact that the D3 ring can be opened more rapidly and more easily due to the higher ring tension than the more stable D4 ring. It also emerges that the decomposition of the polycyclosiloxanes D6 and D5 also require a higher activation energy than D4 to trigger a thermal separation of the corresponding ring molecules. On the whole, however, it has been found that the energy difference between D4 and D3 is greater than between D4 and D6.

For this reason and since D3 shows a greater tendency towards polymerization reactions, it has turned out to be advantageous when the amount of the additional component D3 is smaller than that of the additional component D6. Thus an advantageous configuration variant of the method according to the invention is distinguished in that mD3 is in the range between 200 wt. ppm and 15,000 wt. ppm and that mD6 is in the range between 50 wt. ppm and 2,000 wt. ppm.

In the above-mentioned quantitative proportions of the additional components, density variations within the soot body of less than 0.4% can be achieved.

With respect to a particle size distribution that is as broad as possible and thus concurrently with respect to a high homogeneity of the soot body and particularly a characteristic of the layer structure of the soot body that is as weak as possible, it has furthermore turned out to be advantageous when the amounts or weight fractions of the additional components at both sides of D4 show a certain distribution. In this respect it has turned out to be useful when the weight ratio mD3/(mD6+mD7+) is in a range between 0.3 and 150, preferably in a range between 0.5 and 100.

During the transition of the liquid feedstock material into the gas phase the composition of the liquid may change due to decomposition, polymerization or distillation. This happens especially when, like in the known vaporization systems, the liquid to be vaporized is brought into contact with a hot surface. Hot surfaces may lead in organic feedstock material to unforeseeable changes, such as decompositions or polymerizations. This results in a certain variability and non-reproducibility in the process control, which may lead to defects in the particle formation process and to inhomogeneities in the soot structure. This will be particularly noticed when, like in the present case, exact compositions of components, which are very similar to one another in terms of chemistry, are important in the particle formation process. Moreover, the known vaporizer systems pose the risk that ultrafine liquid droplets are entrained together with the discharged vapor stream, which may also lead to material inhomogeneities in the soot body.

To avoid such effects or to keep them as small as possible, a vaporization method is preferably used in which the vaporizing process comprises the following steps:

heating the $SiO_2$ feedstock material, introducing the heated $SiO_2$ feedstock material into an expansion chamber, so that at least a first part of the $SiO_2$ feedstock material vaporizes due to a pressure drop, mixing the $SiO_2$ feedstock material with a heated diluent, so that at least a second part of the $SiO_2$ feedstock material vaporizes due to a decrease in the dew point.

In this two-stage vaporizing process the liquid $SiO_2$ feedstock material is atomized in the expansion chamber into fine droplets which are completely vaporized without any contact with solid, particularly metallic, surfaces.

Thus it is possible to convert the composition provided in the liquid $SiO_2$ feedstock material, including weight ratio mD3/mD6 and mD7+, into the gaseous $SiO_2$ feedstock vapor. Therefore, one obtains congruent proportions of the additional components in the liquid $SiO_2$ feedstock material and in the $SiO_2$ feedstock vapor, hereinafter also called "feedstock vapor" in short.

Hence, this procedure satisfies two principal requirements. On the one hand, the provided liquid $SiO_2$ feedstock material is converted as completely as possible (i.e. at least 99% by wt.) into the gas phase. On the other hand, this vaporization process is configured such that the $SiO_2$ feedstock material vaporizes while maintaining the proportional composition of the components. In particular, the mass ratio of the additional components is to be substantially congruent in the liquid phase and also in the gas phase.

Within the scope of the invention the statement that vaporization takes place congruently while maintaining the weight ratios refers to the ratio mD3/mD6 in the liquid and in the solid phase. The ratio $$\tau = (G\_liquid - G\_vapor)/G\_liquid$$

should thus be not more than ±500 ppm, preferably not more than ±100 ppm, wherein G_liquid is the weight ratio mD3/mD6 in the liquid $SiO_2$ feedstock material, and G_vapor is the weight ratio mD3/mD6 in the gaseous $SiO_2$ feedstock material.

A diluent is used for vaporizing the feedstock material. Advantageously, the diluent is a carrier gas which flows through the expansion chamber. For this reason the term diluent gas and the term carrier gas will be used as synonyms hereinafter. The partial pressure of the liquid $SiO_2$ feedstock material in the expansion chamber is reduced by supplying the diluent, whereby the dew point thereof is lowered, so that a possible preliminary heating of the $SiO_2$ soot body need not be strong to ensure a complete conversion of the $SiO_2$ feedstock material into the $SiO_2$ feedstock vapor.

Ideally, the liquid feedstock material is completely converted into the gas phase. A vaporization degree of at least 99% by wt., preferably at least 99.9995% by wt., of the liquid $SiO_2$ feedstock material entering the vaporization process is however acceptable. This can be achieved by means of the two-stage vaporization process, i.e. the combination of the vaporization due to a pressure drop and a decrease in the dew point. Of the $SiO_2$ feedstock material introduced as a liquid into the vaporizer, only very small fractions, preferably less than 20 ppm, preferably less than 10 ppm, particularly preferably less than 5 ppm, do not vaporize. In individual tests the fraction of non-vaporized $SiO_2$ feedstock material could even be reduced to less than 2.5 ppm.

The "dew point" is here the temperature at which an equilibrium state between condensing and evaporating liquid is obtained.

In an advantageous configuration of this procedure it is intended that introducing the heated $SiO_2$ feedstock material into the expansion chamber comprises an injection phase in which the $SiO_2$ feedstock material is atomized in liquid form into fine droplets, the droplets having a mean diameter of less than 5 µm, preferably of less than 2 µm.

The liquid feedstock material is transformed into a cloud of small droplets which can evenly vaporize due to expansion as a result of the pressure drop. The fine droplets provide a large surface that allows a rapid and efficient and above all complete vaporization of the liquid feedstock material before it gets into contact with hot surfaces of the vaporizer. Changes in the composition due to decomposition, polymerization or distillation are thereby avoided to a substantial degree, so that a defined composition of the feedstock material supplied to the consumer as well as a reproducible particle formation process are ensured.

The combination according to the invention of providing a composition of the feedstock material optimized for homogeneous soot formation, on the one hand, and the maintenance thereof during vaporization and the supply to the reaction zone, on the other hand, results in a soot body from which a quartz glass that is distinguished by high material homogeneity and radiation resistance is obtained by sintering or vitrification.

To support the division of the liquid into small droplets, ultrasonic atomizers are in principle suited, in the case of which due to the action of ultrasound a uniform and fine atomization of the $SiO_2$ feedstock material is induced. Within the scope of the invention ultrasound designates a sound with frequencies between 16 kHz and 1.6 GHz. In an ultrasonic atomizer the liquid is atomized without pressure application and without heating. For instance, a piezoceramic wetted with the liquid can be induced to vibrate by means of high-frequency alternating voltage. As a consequence, ultrasonic waves form in the liquid, the maximum strength of said waves being reached at a specific liquid level and said waves effecting the formation of a so-called ultrasonic trunk. Small liquid droplets or aerosols detach from this ultrasonic trunk and can be used for the desired application. The advantage of ultrasonic atomizers lies in the uniform atomization of variable volume flows, the almost constant drop spectrum over the whole volume flow range and the drops' own small velocity, resulting in a good controllability of the jet. Thus, a narrow droplet size distribution can be accomplished in a reproducible manner through ultrasonic atomization, which has a positive effect on the uniformity of the vaporization result.

As an alternative, the conversion of the liquid feedstock material into the vapor phase takes place exclusively by use of the carrier gas, with the consequence of the reduction of the partial pressure. Correspondingly sufficient amounts of the diluent/carrier gas must here flow through the expansion chamber and thereby ensure vaporization of the liquid $SiO_2$ feedstock material.

As a third and particularly preferred alternative, the liquid feedstock material is vaporized both by using the pressure drop and by lowering the partial pressure. This variant has turned out to be particularly advantageous when large amounts of liquid feedstock material have to be vaporized for obtaining large-volume quartz glass cylinders (e.g. with diameters of more than 250 mm). To convert the needed large feedstock material amounts in a gentle and uniform manner from the liquid phase into the gas phase, it has turned out to be advantageous when a $SiO_2$ feedstock material which is overheated at least for partial components is introduced into the expansion chamber and is there transferred by pressure drop and by use of a diluent into the gas phase. This combination of the vaporization process due to a pressure drop and a reduction of the dew point makes it possible that of the $SiO_2$ feedstock material introduced into the vaporizer in a liquid form, only very small amounts do not vaporize.

The liquid $SiO_2$ feedstock material can be transferred more easily and uniformly into the gas phase if the individual amounts to be vaporized are each small and have a large surface. This can optimally be achieved in that the liquid of the $SiO_2$ feedstock material is atomized into fine droplets. The finer the droplets, the more efficient, complete and rapid is the vaporization process. The atomized droplets can then be transferred via pressure drop and/or blending with the heated diluent/carrier gas into the gas phase.

It has turned out to be advantageous when the contact of the fine droplets with the hot carrier gas takes place in a chamber that is kept at a temperature ranging from 150° C. to 230° C. At a temperature of less than 150° C. there is a certain risk that droplets do not vaporize completely, so that liquid is entrained into the reaction zone, which leads to inhomogeneities in the particle formation process and to defects in the soot body structure, such as bubbles. At a temperature above 230° C., otherwise energetically inhibited reactions with non-reproducible and undesired reaction products, particularly decompositions and polymerization reactions, are more likely.

The size range of the droplets depends on many parameters. Apart from the rheological properties of the liquid and the geometry of the atomizing nozzle, this is particularly the exit velocity of the liquid out of the atomizing nozzle, which is substantially defined by the pressure difference. Within a pressure difference range of 1.2 to 1.8 bar the exiting liquid jet disintegrates into fine drops with a particularly narrow drop size distribution on account of a turbulent flow.

Preferably, a carrier gas is used that contains nitrogen, argon or helium.

These are gases that show an inert behavior with respect to polyalkylsiloxanes, so that oxidation, polymerization or decomposition reactions between the liquid and the carrier gas, particularly under pressure and at an elevated temperature, and thus a non-reproducible change in the composition of the feedstock material are avoided.

A further configuration variant of the method according to the invention is distinguished in that upon introduction of the $SiO_2$ feedstock material into the expansion chamber a composition of the $SiO_2$ feedstock material is measured by means of a concentration detector.

Within the scope of this configuration the composition, i.e. e.g. the ratio D3, D6 and D7, is directly monitored at the expansion chamber. The supplied $SiO_2$ feedstock material is here analyzed by means of the concentration detector, e.g. a gas chromatographer. Such an analyzing device with a concentration detector can also be arranged at the outlet of the expansion chamber and can determine the composition of the $SiO_2$ feedstock vapor. One or both detectors may be part of a quality management system and send the composition measurement to a computing system where the quality of the added materials and vapors is monitored. Such a permanent monitoring of the composition and the weight fractions of the $SiO_2$ feedstock material ensures that the method according to the invention can be employed at any time and soot bodies can thereby be built up having a variance of the density variations of only $\delta_{inv}$=0.023%. Extremely homogeneous synthetic quartz glasses can then be produced by vitrification from soot bodies of such a structure.

The liquid feedstock material can then be produced by mixing the individual components D3, D4, D5, D6 and D7 or by blending component mixtures. Preferably, providing a liquid $SiO_2$ feedstock material according to method step (a) comprises:

providing a first mixture of polyalkylsiloxanes in which D3, D4, D5, D6 and the linear homologs thereof account for at least 99.99 wt. %, providing a second mixture of polyalkylsiloxanes in which mD7+ accounts for an amount of at least 40 wt. %, preferably at least 80 wt. %, particularly preferably at least 90 wt. %.

producing a blend from the first and second mixture of polyalkylsiloxanes prior to or during vaporization according to method step (b) in a mixing ratio leading to a weight fraction for mD7+ of at least 20 wt. ppm in the total mixture.

A polyalkylsiloxane mixture in the sense of the first mixture, based on D4 and with D4 and D6 in the ratio and in the amount as desired, can e.g. be obtained in that a standard distillation process is used for the purification of D4. This distillation process can then be run until purification of D4, which however is not necessary—also for reasons of costs—because additional components are removed from the mixture, if necessary, and these must again be added by means of the second mixture. In the total mixture the first mixture accounts for the much greater fraction, e.g. more than 99% by wt. As a rule, the quantitative amount mD7+ is however too small in such mixtures.

The second mixture primarily serves to set the predetermined amount of D7 (and/or D8) and possibly to correct the ratio mD3/mD6 and the ratio mD3/mD7+. Polyalkylsiloxane mixtures with a high amount of D7 and longer-chained molecules are obtained by single or repeated distillation of polyalkylsiloxane mixtures, as are e.g. used as so-called polyalkylsiloxane raw mixtures at the beginning of a distillation process for D4, or by single or repeated distillation of polyalkylsiloxane mixtures that arise during distillation as so-called "sump". Moreover, in such polyalkylsiloxane mixtures one can also find other organic substances, apart from siloxanes, and also a high amount of D7 and D8. The necessary blending amount of the second mixture depends essentially on the amount of mD7+ and is small in comparison with the blending amount of the first mixture. An expensive purification of D4 or the use of high-purity D4 can be omitted at any rate.

The blending of first and second mixture takes place in the liquid phase of the feedstock material. As an alternative, the first and the second mixture are first vaporized and the mixing process is carried out by combining the vapor flows before or during method step (c). Due to the use of separate vaporizers for different components of the feedstock material the vaporization parameters, such as vaporization temperature and vaporization rate, can be individually adapted to the components to be vaporized and they can be optimized.

In a preferred method variant, it is intended that the $SiO_2$ particles are deposited on the deposition surface according to method step (b) in that the feedstock material vapor is supplied to a plurality of deposition burners arranged in a burner row, which are moved jointly reversingly along the deposition surface.

In this known method of producing SiO₂ soot bodies the deposition burners are reciprocated along a sub-section of the soot body surface. Due to the differences in the geometry of the individual deposition burners or in the media supply to the burners, this procedure is particularly prone to density variations in the soot body, particularly also in the overlap region of neighboring deposition burners. It has been found that the soot density homogeneity can be improved, particularly in the area of the turning points of the burner movement, which can be ascribed to the characteristic of the method according to the invention to rather blur than allow soot density differences on account of the broadening of the particle size distribution in the particle formation process.

The method according to the invention is therefore particularly well suited for producing synthetic quartz glass that is used for the production of optical fibers. Small density variations of the soot body facilitate the production of high-quality quartz glass that is particularly suited for optical fibers for telecommunications.

PREFERRED EMBODIMENT

The invention will now be explained in more detail with reference to embodiments and a drawing, in which.

Figure 1:
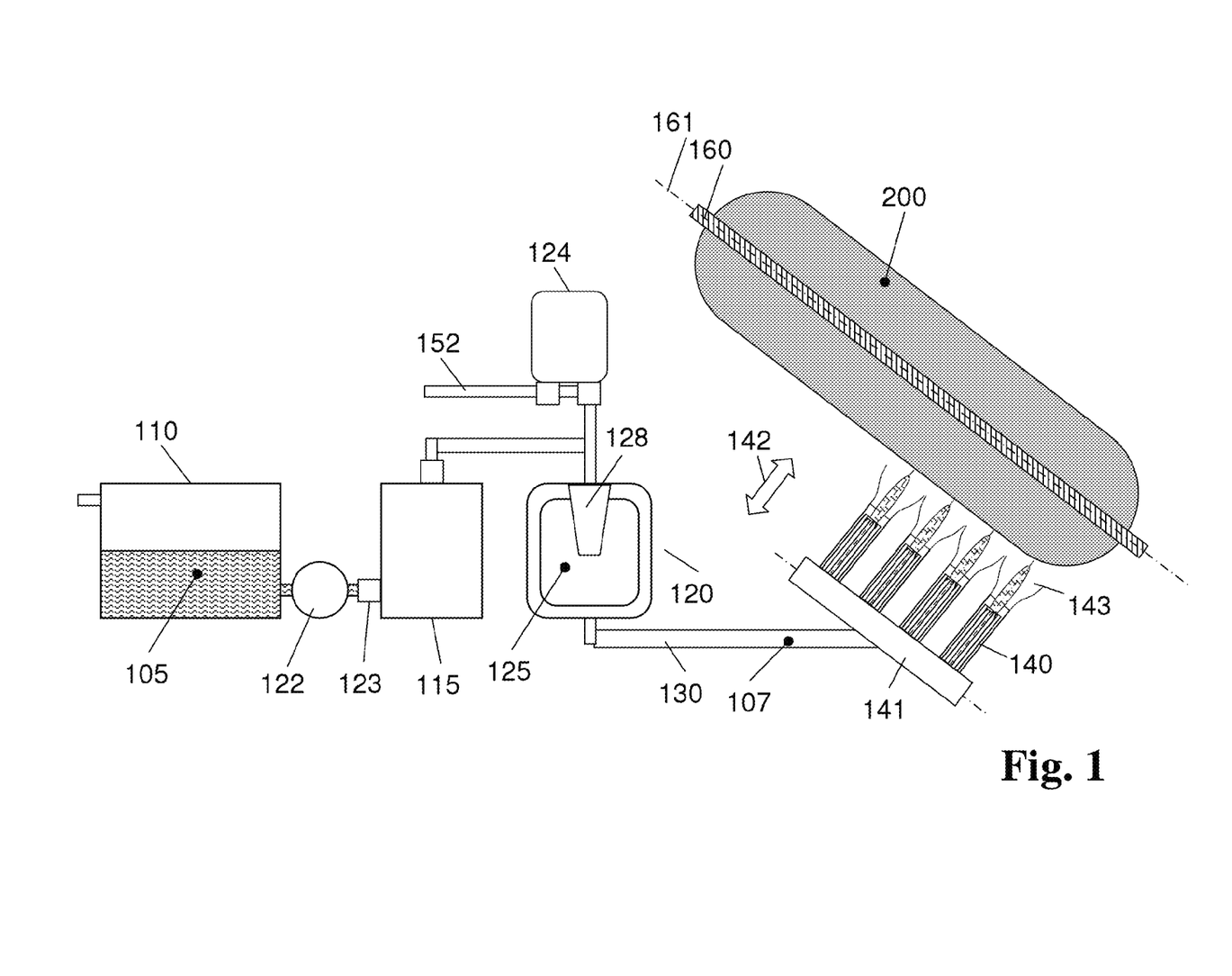
FIG. 1 shows a device for performing the method according to the invention for producing a SiO₂ soot body, in a schematic illustration.

The device shown in FIG. 1 serves to produce a SiO₂ soot body 200. A plurality of flame hydrolysis burners 140 which are arranged in a row are disposed along a carrier tube 160 of aluminum oxide and are reversingly reciprocated for soot deposition in a joint burner row along the rotating carrier tube 160, each of the burner flames 143 only sweeping over a sub-length of the carrier tube 160. The flame hydrolysis burners 140 are mounted on a joint burner block 141 which is reciprocated in parallel with the longitudinal axis 161 of the carrier tube 160 between two turning points that are stationary with respect to the longitudinal axis 161, and which is displaceable in a direction perpendicular thereto, as outlined by the directional arrows 142. The burners 140 consist of quartz glass; their center-to-center distance is 15 cm.

The burner flame 143 assigned to each of the flame hydrolysis burners 140 constitutes a reaction zone within the meaning of the invention. The flame hydrolysis burners 140 are each fed with oxygen and hydrogen as burner gases and with a SiO₂ feedstock vapor as feedstock material for the formation of the SiO₂ particles, the SiO₂ feedstock vapor 107 containing a mixture of vaporized polyalkylsiloxanes with the composition as can be seen in Table 1. The liquid SiO₂ feedstock material 105 which is enriched with additional components is vaporized and supplied to the reaction zone in a gaseous form and is decomposed therein by oxidation and/or hydrolysis and/or pyrolysis into SiO₂ particles.

The SiO₂ particles themselves are present in the form of agglomerates or aggregates of SiO₂ primary particles with particle sizes in the nanometer range. The SiO₂ particles are deposited on the cylinder outer surface of the carrier tube 160 rotating about its longitudinal axis 161, so that the soot body 200 is built up layer by layer with an outer diameter of 350 mm. During the deposition process, a temperature of about 1200° C. is established on the soot body surface.

The SiO₂ feedstock vapor 107 with the polyalkylsiloxane mixture is produced by means of a vaporizer system 120 that comprises a storage container 110 for the liquid mixture, a liquid pump 122, a flow meter 123 for liquid, an MFC (mass flow controller) 124 for the controlled supply of a carrier gas stream 152 of nitrogen, and a double-walled heatable vaporization chamber 125 with an atomizer 128. The storage container 110, a pump 122 and an atomizer 128 are interconnected by means of flexible metallic lines. The storage container 110 is heated to a temperature of 170° C., and the heated liquid is supplied by means of the pump 122 via the flow meter 123 in an exact dosage to the atomizer 128. A concentration detector may here be provided in the connection line between the flow meter 123 and the atomizer 128 for monitoring the composition of the SiO₂ feedstock material 105 and/or the SiO₂ feedstock vapor 107.

The atomizer 128—also called atomizing nozzle—is an ultrasonic atomizer. Said atomizer is simultaneously fed with a nitrogen carrier gas stream via the MFC 123 at a pressure of 1.5 bar to 5 bar and with the liquid to be vaporized. Said liquid is atomized into fine droplets with a maximum diameter of 1 μm and a small droplet size distribution with a mean diameter ($d_{50}$ value) of 0.7 μm and directly sprayed into the vaporization chamber 125 in this process.

The vaporization chamber 125 has an internal temperature of 195° C., so that the fine liquid droplets vaporize immediately and the vapor stream is supplied to a stationary flow distributor and distributed by said distributor via heat-insulated flexible media supply lines over the individual deposition burners 140. A feed line for the combustion gases oxygen and hydrogen and one for an auxiliary gas (oxygen), which is used in the burner flame 143 between the stream of the feedstock material and the stream of the combustion gas and which counteracts premature mixing, also terminate in the flow distributor. Thus combustion gases and SiO₂ feedstock vapor 107 are only mixed in the hot zone of the burner flame 143.

After completion of the deposition process a tube of porous SiO₂ soot (soot tube) is obtained which is subjected to a computed tomography (CT) analysis. The soot tube 200 is irradiated over its length with X-rays. The images obtained thereby permit quantitative and qualitative statements on the intensity and homogeneity of the axial and radial layer structure of the soot tube 200.

TABLE 1

| No. | mD3 | mD6 | mD7+ | mD3 + mD6 | mD3/mD6 | mD3/(mD6+mD7+) | "S" |
|---|---|---|---|---|---|---|---|
| 1 | 5000 | 50 | 20 | 5,050 | 100 | 71.4 | ++ |
| 2 | 300 | 250 | 30 | 550 | 1.2 | 1.1 | + |
| 3 | 15,000 | 100 | 60 | 15,100 | 150 | 93.8 | + |

TABLE 1-continued

| No. | mD3 | mD6 | mD7+ | mD3 + mD6 | mD3/mD6 | mD3/(mD6+mD7+) | "S" |
|---|---|---|---|---|---|---|---|
| 4 | 700 | 300 | 500 | 1,000 | 2.33 | 0.9 | + |
| 5 | 1,000 | 2,000 | 90 | 3,000 | 0.50 | 0.5 | 0 |
| 6 | 80,000 | 130 | 70 | 80,130 | 615 | 400.0 | − |
| 7 | 46,000 | 9,200 | 150 | 55,200 | 5 | 4.9 | 0 |
| 8 | 48,000 | 70 | 180 | 48,070 | 686 | 192.0 | − |
| 9 | 300 | 5,600 | 120 | 5,900 | 0.1 | 0.1 | − |
| 10 | 25,300 | 25,300 | 300 | 50,600 | 1 | 1.0 | + |
| 11 | 5,400 | 10,700 | 500 | 16,100 | 0.50 | 0.5 | 0 |
| 12 | 108,000 | 1000 | 150 | 109,000 | 108 | 93.9 | + |
| 13 | 15,000 | 100 | 15 | 15,100 | 150 | 130.4 | − |

All concentrations of the polyalkylsiloxanes in Table 1 are indicated in wt. ppm, with the remaining fraction consisting each time of D4 and the chemically similar D5 and of unavoidable impurities.

The parameter "S" is a qualitative measure of the homogeneity and the intensity of the layer structure detected by way of the CT measurement. The symbols of the qualitative assessment are as follows:
"++" very good,
"+" good,
"0" acceptable,
"−" poor and
"−−" very poor.

Table 1 lists different compositions of the liquid $SiO_2$ feedstock material that were examined in experiments, as well as the quality results that were determined on the respective soot tube.

The liquid $SiO_2$ feedstock material was produced from polyalkylsiloxane mixtures. The first start mixture is commercial high-purity D4 which mainly contains only fractions of D3 and D5, but hardly any D6 and no D7 and no D8.

The second start mixture is also commercial D4, but of less purity. This start mixture substantially contains D3, D4, D5 and small amounts of D6 and D7. This mixture constitutes the main amount in the feedstock material.

The third polyalkylsiloxane mixture is also a distillate of polyalkylsiloxanes. The start liquid is here a so-called "sump", as is obtained in a standard polyalkylsiloxane distillation of D4 and which substantially contains the high-boiling constituents of the original polyalkylsiloxane raw mixture. These high-boiling constituents include D7 and D8. The sump is repeatedly distilled for D7, so that a start mixture is obtained that contains D7 in a concentration of 85% by wt.

The start mixtures are mixed in the liquid phase with formation of a total mixture in such a mixing ratio that a feedstock material evolves with the desired fractions of additional components. The fraction of the third start mixture in the total mixture is at any rate clearly less than 1% by wt.

As can clearly be seen, admixtures of D3 and D6 with a weight ratio mD3/mD6 in a range between 0.5 and 500, particularly between 1 and 200, lead to high-quality soot bodies, i.e. homogeneous soot bodies of a reduced layer number, on condition that the weight fraction of D7 is at least 20 ppm at the same time. If these weight ratios are exceeded or not reached, the number of inhomogeneities will rise and the quality of the synthetic quartz glass will thus decline. For instance, the qualitative results of Table 1 show that when a feedstock material is used in the form of a mixture containing, apart from D4, a suitable quantitative proportion of the polyalkylcyclosiloxanes D3, D6, and D7, one will obtain a quartz glass in an economic way that has a uniform layer structure with a minor layer formation.

Moreover, it has been found that the sum of the weight fractions of the components mD3 and mD6 is preferably in a range between 200 and 20.000 wt. ppm and that the weight fraction mD7+ should be at least 20 ppm, preferably at least 50 wt. ppm, to achieve an optimal homogeneity of the quartz glass body. Deviations from the selected range and/or the selected sum of the weight fractions will each time reduce the homogeneity of the quartz glass. Particularly distinguished was the sample having an mD3/mD6 ratio between 1 and 200 and an mD7+ fraction that does not exceed 150 wt. ppm.

It is only possible to implement the advantages according to the invention within a restricted composition window. The effect will fade when the weight ratios vary beyond the claimed range.

The soot bodies produced according to the prior art and/or the method according to the invention can have a density that is between 25-32% of the density of quartz glass. The achieved density depends inter alia on the distance of the burners from the deposition surface, the set temperature, the stoichiometry of the gases and the geometry of the deposition burners. Different density curves within the soot body, e.g. linear, ascending or descending radial density curves in soot bodies, can be obtained by varying these factors. To analyze the density distributions, the local density of a soot body was determined with known methods at about 700 measurement points. To this end about 50 cross section images are made by means of CT methods over the length of the soot body, each of the images showing a section transverse to the longitudinal axis of the soot body. To determine the radial density curve, 14 approximately equidistant measurement points are recorded in each of the 50 CT sections. With this method the respective radial density curve can be determined along a sectional area through the soot body and also a density profile along the longitudinal axis of the soot body.

Figure 7:
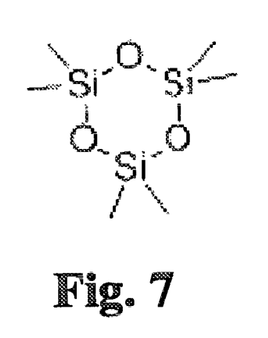
FIG. 7 shows a constitutional formula of the molecule D3.
Figure 8:
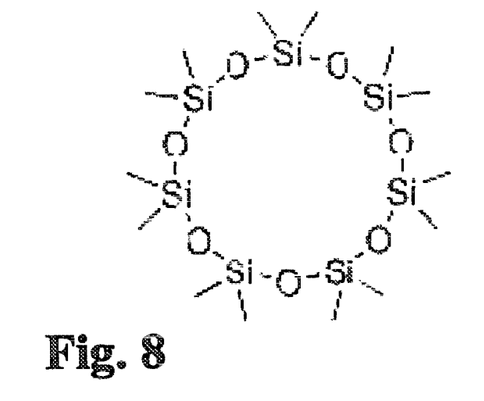
FIG. 8 shows a constitutional formula of the molecule D7.

As has been explained, it seems probable that the use of the $SiO_2$ feedstock material with additional components of different molecule sizes and reactivities leads to a broadening of the particle size distribution. To illustrate the different molecule sizes, FIG. 7 shows a constitutional formula of the molecule D3, and FIG. 8 a constitutional formula of the molecule D7.

At a molecular level $SiO_2$ agglomerates and aggregates of different sizes are created, the size distribution thereof covering a broader range. The real size distribution of the soot particles is broader than a size distribution of $SiO_2$ soot particles made from pure D4. The broader particle size distribution makes it possible to form a more uniform fill for the reason that cavities are filled more uniformly. This results in a lower density variation—under macroscopic aspects—within the $SiO_2$ soot body. Thus, the densities determined within the scope of the 700 measurement points reflect the macroscopic result of the microscopically broader particle size distribution.

The mean value of the density M is obtained by forming the mean of all 50 measurement points whose geometric position varies along the longitudinal axis of the soot body, but not their geometrical distance from the central axis. In the case of average soot bodies, 50 cross sections are made through the soot body by way of the computed tomography method, so that the mean value of the density follows from averaging 50 density measurements each time. In general, the mean values of the density are each distributed in a normal way so that a width a can be determined. To determine the radial density profile, 14 measurement points are determined in each of the 50 sections: the radial distance of said points from the center point of the soot body is here increasing. The variance δ of the width σ of the mean value M thus contains a statistics of 14 points.

In soot bodies that have or should have a constant density distribution, the mean value M of the density of the soot body and the width a of the mean value of the densities over 50 measurements can be determined on the basis of the measurement data obtained. The value σ thereby shows how strongly the density varies at a predetermined distance from the deposition surface along the longitudinal axis of the soot body. In addition, it is also possible to calculate the variance δ of the width σ on the basis of the 14 measurement points that were determined for recording the radial profile.

To make the prior art comparable with the measurements carried out according to the invention, several soot bodies were measured. The attempt was made to keep the boundary conditions, such as distance from the burner, burner temperature and combustion gas stoichiometry, as constant as possible because these have a great influence on the respective density of the soot bodies. Soot bodies were each time produced that had a linear density profile and reached a density between 25% and 32% of the density of quartz glass. When known methods or materials were used, one obtained the following measurement values for the width σ and the variance δ of the density of the soot body:

$\sigma_{StdT}=0.4\%$ and $\delta_{StdT}=0.025\%$.

The values are each indicated in the relative density based on the density of quartz glass.

The addition of additional components D3, D6 and D7 in a $SiO_2$ feedstock material that is otherwise predominantly constituted by D4 leads to a broadening of the particle size distribution. This broadening of the particle size distribution has the effect that the density variations in the soot body get smaller per se. Astonishingly, it has also been found that the variation of the density variations was reduced. One obtained, on average, the following values for the width σ and the variance δ of the density of the soot body:

$\sigma_{inv}=0.37\%$ and $\delta_{inv}=0.023\%$.

In this instance, too, the values are each indicated in the relative density based on the density of quartz glass. The use of the method according to the invention thereby leads to a reduction of the measured density variations by up to 9%. Astonishingly, the variation of the width is also reduced by up to 8%. This reduction of the variation of the variation width of the mean densities results in a much more homogeneous quartz glass than is known in the prior art.

Figure 2:
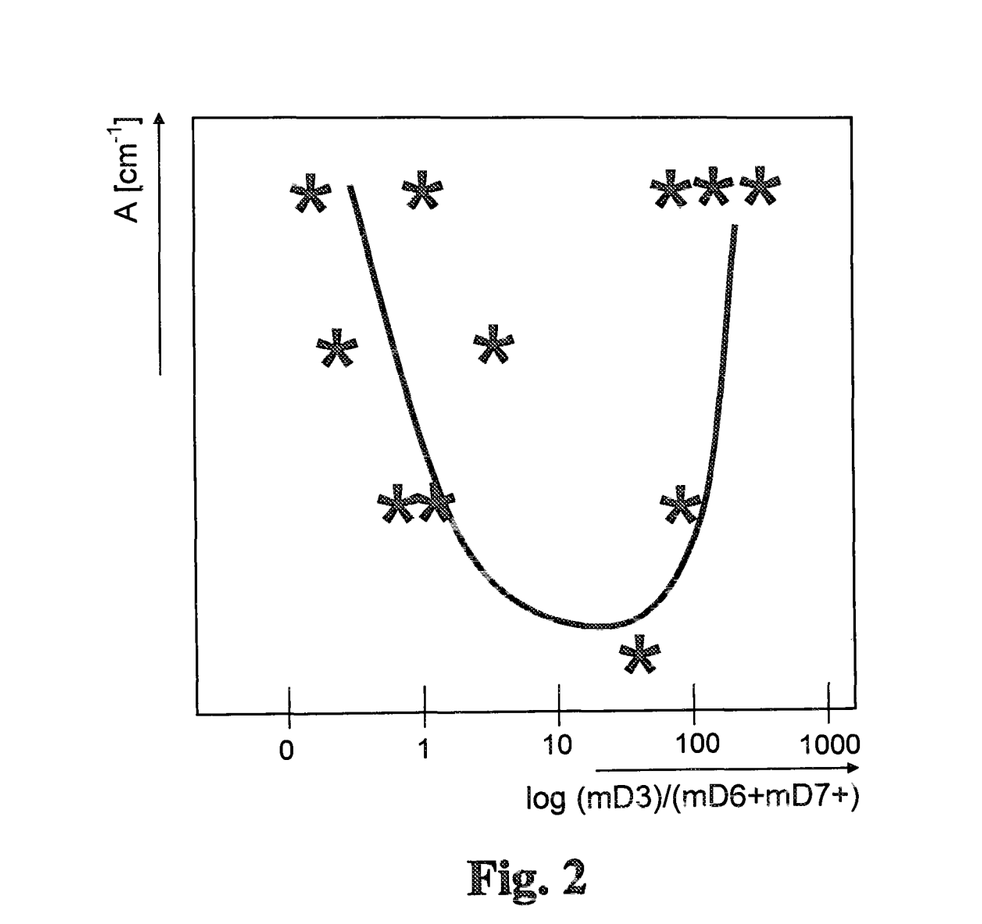
FIG. 2 shows a diagram regarding the layer density in soot bodies in dependence upon the composition of the feedstock material.

The measurement results listed in Table 1 are also reflected in the diagram of FIG. 2. In the ordinate, the number "A" of the layers in the soot body per length unit (in cm) is plotted, as can be determined from the CT measurements, and in the abscissa in the logarithmic plot the ratio of the weight fractions mD3(mD6+mD7+) in the range of 0 to 1000.

The ratio mD3/mD6 is variable in these measurements: likewise, the total weight (mD3+mD6) and the weight fraction mD7+ vary, so that possibly existing relations between the composition and the product quality may be covered by other effects. Nevertheless, the tendency can be determined in general and qualitatively that with respect to the $SiO_2$ soot quality the mass ratio mD3/(mD6+mD7+) yields a relatively pronounced optimum in the range around 50 to 90, which rapidly declines towards smaller or greater ratio values. The best soot quality was obtained at a ratio mD3(mD6+mD7+) of about 70.

Figure 3:
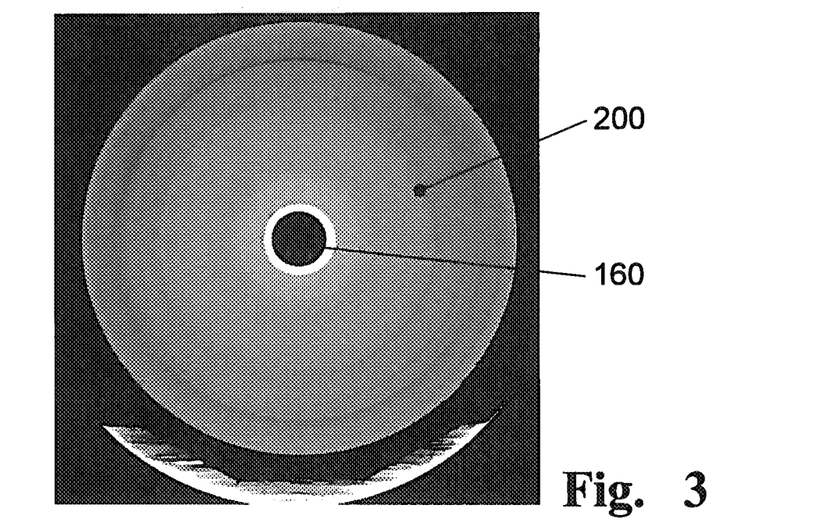
FIG. 3 is a CT image of a soot tube produced according to the invention from different polyalkylsiloxanes using a feedstock material, in a view taken in the direction of the longitudinal axis of the soot tube.
Figure 4:
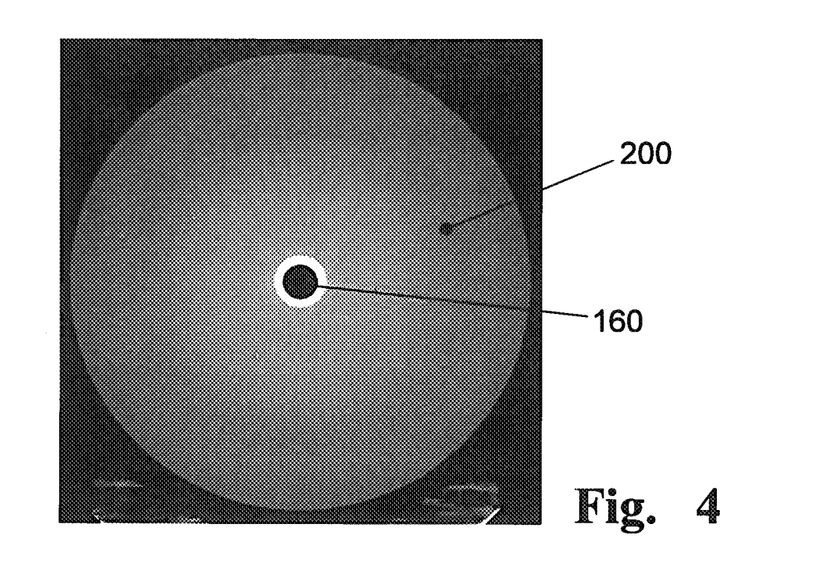
FIG. 4 shows, by way of comparison, a CT image of a SiO₂ soot tube produced as feedstock material on the basis of the prior art by using a pure octamethylcyclotetrasiloxane.

FIGS. 3 and 4 show layer images that were made by X-ray computed tomography methods. A cross section through a cylinder-shaped quartz glass body can each time be seen. The section is here made in a direction transverse to the longitudinal axis of the quartz glass body. As explained, the amorphous $SiO_2$ particles are deposited on a deposition surface. Said deposition surface can be seen in each of said FIGS. 3 and 4 as a white ring in the center of the quartz glass body that is otherwise shown in a grayish color. The $SiO_2$ particles are deposited layer by layer under rotation of the rod-shaped deposition surface.

The CT image of FIG. 3 shows the $SiO_2$ soot tube produced by using a $SiO_2$ feedstock material 105 according to sample no. 5 of Table 1, in this imaging technique, regions of a relatively high density are shown as bright surface regions. It is evident that the density is uniformly decreasing from the inside to the outside. Radial layers are hardly visible. By comparison, FIG. 4 shows a CT image of a soot tube produced according to the prior art with a commercial feedstock material. Radially extending layers can be detected by way of brightness differences. The smaller inner diameter in the sample according to FIG. 4 is due to the use of a carrier having a smaller outer diameter in the deposition process for producing the $SiO_2$ soot tube. Density variations can particularly be detected in an easy and clear way by using X-ray radiation for visualizing the cross section of the quartz glass body. It is obvious that the quartz glass body that was produced according to the known method has a plurality of concentrically structured density variation rings. Such types of density variations may have drawbacks particularly when the quartz glass is used for optical fibers.

By contrast, FIG. 3 clearly shows that there are no longer any concentric rings that would hint at density variations. An optical control of the images made by computed tomography already reveals that quartz glass bodies that show a very uniform homogeneity can be produced by using a polysiloxane mixture which contains the additional components D3, D6 and D7 in predetermined amounts and weight ratios. The uniform homogeneity of the quartz glass directly follows from the homogeneous distribution of the $SiO_2$ particles in the soot body. The transition from the $SiO_2$ soot body to the synthetic quartz glass takes place under supply of thermal energy. Within the scope of this method step called vitrification, defects or density variations that are present in the $SiO_2$ soot body manifest themselves in the quartz glass. The use of polyalkylsiloxanes with additional components leads, as has been explained, to a broadening of the particle size distribution. Thus the variance of the density variations of the soot body can be reduced to only $\delta_{inv}=0.023\%$. Such homogeneous $SiO_2$ soot bodies can then be converted into also extremely homogeneous quartz glass bodies by vitrification.

Figure 5:
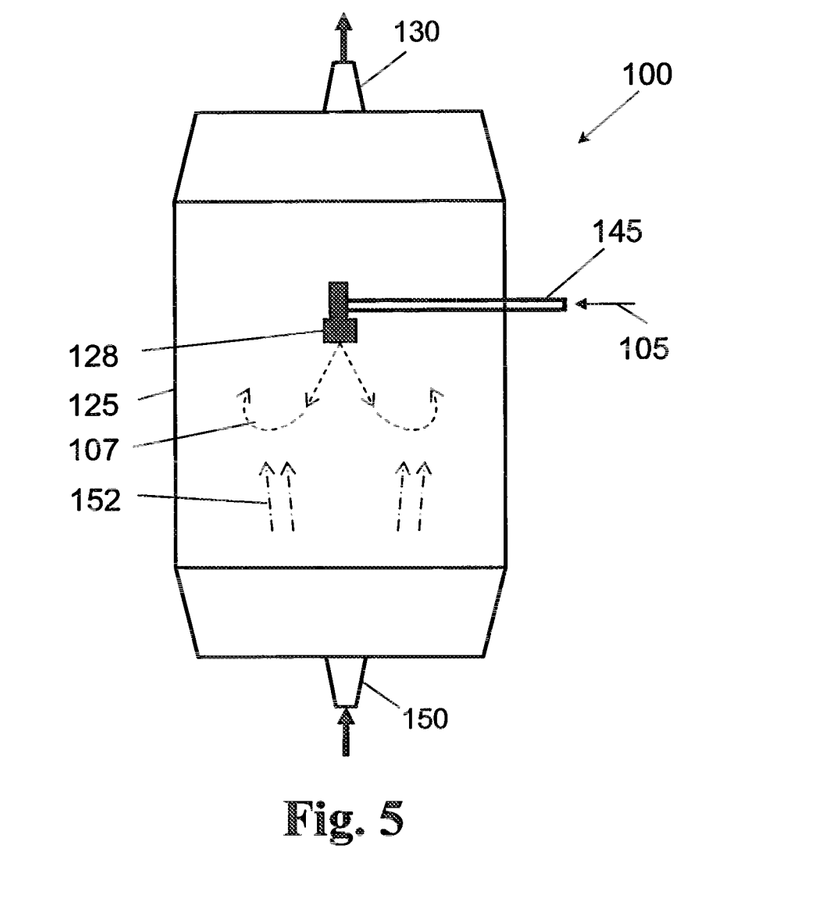
FIG. 5 is a schematic diagram showing the various elements of the quartz-glass producing system according to the invention.

FIG. 5 shows the system 100 for producing quartz glass which uses the method according to the invention. For this purpose the system 100 comprises a storage tank 110 from which the liquid $SiO_2$ feedstock material 105 is pumped by means of a pump (not shown) into a pre-heating device 115. With the help of known methods the liquid $SiO_2$ feedstock material 105 is heated up in the pre-heating device 115 to an elevated temperature. After having flown through the pre-heating device 115, the liquid $SiO_2$ feedstock material 105 is pumped into the expansion chamber 125 of the vaporizer 120. As will still be explained in more detail, the transition of the liquid $SiO_2$ material into the gaseous $SiO_2$ feedstock vapor 107 takes place in the expansion chamber 125. The $SiO_2$ feedstock vapor 107 flows via a line 130 to the burner 140 where a pyrolytic or hydrolytic conversion of the $SiO_2$ feedstock vapor into $SiO_2$ particles takes place.

The pre-heating device 115 has an inlet 116 and an outlet 117. The $SiO_2$ feedstock material 105 is fed through the inlet 116 into the pre-heating device 115. The $SiO_2$ feedstock material 105 is heated within the pre-heating device 115. This can be done by using a hot oil system or an electric heating element in the walls of the pre-heating device. To heat up the liquid $SiO_2$ feedstock material 105 in a uniform manner while avoiding hot regions, it has turned out to be advantageous when the pre-heating device 115 comprises a flow channel which is surrounded by hot oil channels. The liquid-to-liquid heat transfer that can thereby be realized achieves a uniform heating of the liquid $SiO_2$ feedstock material 105. This type of uniform heating ensures that there is no temperature-induced chemical conversion of the D3, D6 or D7 molecules. The heated liquid $SiO_2$ feedstock material 105 is discharged from the pre-heating device 115 into the expansion chamber 125 through a feed line 145.

The expansion chamber 125 defines an inner volume for the free expansion of the $SiO_2$ feedstock vapor. To achieve such a vaporization of the liquid $SiO_2$ feedstock material into the gaseous feedstock vapor, the temperature of the liquid $SiO_2$ feedstock material is raised in the pre-heating device 115 above the boiling point of the $SiO_2$ feedstock material at the operating pressure of the expansion chamber. A preferred operating temperature for the pre-heating device 115 is about 220° C. The boiling point of D4 at atmospheric pressure is about 175° C. To avoid a situation where the liquid $SiO_2$ feedstock material boils at 220° C., a back-pressure is needed in the pre-heating device 115 of about 100 kPa. The liquid reactant is thereby kept as an undercooled (compressed) liquid in the pre-heating device 115.

Figure 6:
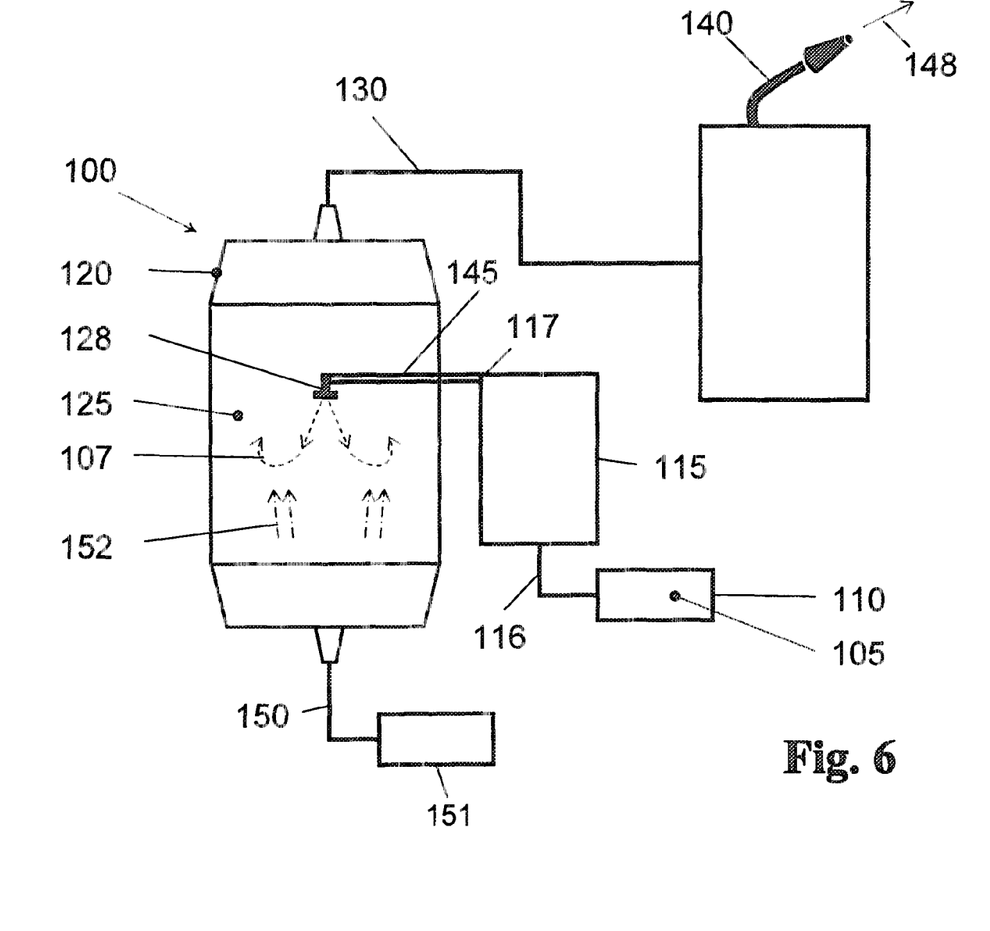
FIG. 6 is a schematic illustration of a vaporization chamber.

As illustrated in FIG. 6, the liquid $SiO_2$ feedstock material flows from the pre-heating device 115 through the feed line 145 into the interior of the expansion chamber 125. The pre-heating device 115 heats the liquid $SiO_2$ feedstock material 105 to an adequate degree, so that it vaporizes almost completely while its pressure drops upon entry into the inner volume of the expansion chamber 125. Such an immediate vaporization will only take place if the pre-heating device 15 has raised the temperature of the liquid $SiO_2$ feedstock material above the boiling point of the $SiO_2$ feedstock material at the operating pressure of the expansion chamber 125. Thus the amount of the $SiO_2$ feedstock material 105 which vaporizes immediately depends on the heating quantity supplied to the liquid $SiO_2$ feedstock material in the pre-heating device 115.

To achieve a particularly uniform and complete vaporization also of the higher-boiling portions of the $SiO_2$ feedstock material, it is advantageous when a heated gaseous diluent is additionally introduced into the chamber. The $SiO_2$ feedstock material comprises a plurality of polyalkylsiloxanes, particularly D3, D4, D6 and D7. Each of the said polyalkylsiloxanes has a different boiling temperature and a different vapor pressure, as can be seen in Table 2.

TABLE 2

| Chemical Designation | Short Name | Molec. Formula | Molec. Weight | $T_b$*[1] [° C.] | $P_v$*[2] [Pa] |
|---|---|---|---|---|---|
| Hexamethylcyclotri-siloxane | D3 | C6H18 O3Si3 | 222 | 134 | 1700 |
| Octamethylcyclotetra-siloxane | D4 | C8H24 O4Si4 | 297 | 175 | 140 |
| Decamethylcyclopenta-siloxane | D5 | C10H30 O5Si5 | 371 | 211 | 33 |
| Dodecamethylcyclohexa-siloxane | D6 | C12H36 O6Si6 | 444 | 245 | 5 |
| Tetradecamethylcyclohepta-siloxane | D7 | C14H42 O7Si7 | 519 | 270 | |
| Hexadecamethylcycloocta-siloxane | D8 | C16H48 O8Si8 | 593 | 290 | |

*[1] $T_b$, boiling point at 760 mmHg
*[2] $P_v$, vapor pressure at 24° C.

To maintain the weight ratios of the additional components, it is important that the $SiO_2$ feedstock material vaporizes completely and congruently. This requires that the supplied amount of heat and the supplied amount of diluent are so great that even D7, which has the highest boiling temperature, can vaporize. In the pre-heating device 115, heat is supplied to the $SiO_2$ feedstock material to heat the same. At temperatures of about 250° C., however, gels may possibly form, especially in the high-boiling polyalkylsiloxanes, D7, D8 or D9. To prevent those high-boiling elements from forming gels, it is advantageous when within the vaporization process a diluent 152 is supplied, preferably a gaseous diluent heated to the desired vaporization temperature. For this purpose the gaseous diluent 152 may flow through a corresponding media line 150 from a storage container 151 into the expansion chamber 125.

Especially nitrogen has turned out to be advantageous as diluent 152. Other diluents, e.g. argon or helium, can also be used if this is desired. These are gases that show an inert behavior with respect to polyalkylsiloxanes, so that oxidation, polymerization or decomposition reactions between the liquid and the carrier gas, especially under pressure and at elevated temperature, and thus a non-reproducible change in the composition of the feedstock material are avoided. The partial pressure of the liquid $SiO_2$ feedstock material in the expansion chamber 125 is reduced by supplying the diluent, and the dew point thereof is thereby lowered. As a result, the $SiO_2$ feedstock material need not be heated at high temperatures in the pre-heating device 115. Rather, temperatures between 150° C. and 230° C. are enough to ensure a complete conversion of the $SiO_2$ feedstock material into the $SiO_2$ feedstock vapor. It is here the aim that the vaporization of the $SiO_2$ feedstock material comprises an injection phase in which the feedstock material is atomized in liquid form into fine droplets, and a vaporization phase in which the fine droplets are rapidly and efficiently vaporized completely by contact with a hot carrier gas, but without contact with walls.

FIG. 6 illustrates the vaporization according to the invention. The heated-up $SiO_2$ feedstock material 105 is supplied through the feed line 145 to the expansion chamber 125. At the end of the feed line 145 in the interior of the expansion chamber 125, the feed line 145 comprises a nozzle-shaped atomizing nozzle 128. With the help of the atomizing nozzle 128 the liquid $SiO_2$ feedstock material 105 is atomized into fine droplets having a mean diameter of less than one μm, preferably between 0.5 μm and 20 nm ($d_{50}$ value). Due to the pressure drop occurring upon exit out of the atomizing nozzle 128, a substantial part of the liquid feedstock material is transferred into the gas phase. In addition, a nitrogen stream preheated to about 200° C. to about 230° C. is passed through the media line 150 into the expansion chamber 125. Advantageously, the nitrogen stream has a temperature that corresponds substantially, i.e. +/−10° C., to the temperature of the liquid $SiO_2$ feedstock material 105. According to the invention the nitrogen stream flows opposite to the spray direction of the liquid $SiO_2$ feedstock material 105 so as to ensure strong intermixing and adequate heat transfer. Due to the combination of the two vaporization principles, pressure drop and vaporization by means of the gaseous nitrogen, the liquid $SiO_2$ feedstock material 105 is fully converted into the gaseous $SiO_2$ feedstock vapor 107. It is not intended that parts of the liquid $SiO_2$ feedstock material 105 deposit on the walls of the expansion chamber 125 and/or are vaporized thermally at said place. The gaseous $SiO_2$ feedstock vapor 107 flows off through the line 130 to the burner 140. In the burner 140, the $SiO_2$ feedstock vapor 107 is converted by pyrolysis, oxidation or hydrolysis into $SiO_2$ particles 148, also called $SiO_2$ or soot or $SiO_2$ soot.

The size range of the droplets depends on many parameters. Apart from the rheological properties of the liquid and the geometry of the atomizing nozzle 128, these are particularly the exit velocity of the liquid out of the atomizing nozzle, which velocity is substantially determined by the pressure difference. Within the said pressure difference range the exiting liquid jet disintegrates into fine droplets with a narrow droplet size distribution due to the turbulent flow.

In another method variant, it is intended that forming the stream of the $SiO_2$ feedstock material comprises generating a first gas stream by vaporizing a mixture of polyalkylsiloxanes, which contains D3, D4, D5 and D6, and generating a second gas stream by vaporizing a second mixture of polyalkylsiloxanes, which substantially contains D3, D4, D5, D6 and D7, and combining the gas streams before or during method step (C). The vaporization parameters, such as vaporization temperature and vaporization rate, can be adapted individually to the components to be vaporized and can be optimized by using separate vaporizers for different components of the feedstock material.

LIST OF REFERENCE NUMERALS

100 system
105 $SiO_2$ feedstock material
107 $SiO_2$ feedstock vapor
110 storage tank/storage container
115 pre-heating device
116 inlet
117 outlet
120 vaporizer/vaporizer system
122 liquid pump
123 flow meter
124 MFC (mass flow controller)
125 expansion chamber/vaporization chamber
126 line
127 flow distributor
128 atomizing nozzle
130 line
140 burner/flame hydrolysis burner
141 burner block
142 movement of 140
143 burner flame
145 feed line
148 $SiO_2$ soot
150 media line
151 storage container
152 diluent
160 deposition surface/carrier tube
161 longitudinal axis of 160
200 soot body

The invention claimed is:

1. A method for producing synthetic quartz glass, said method comprising:
 (a) providing a liquid $SiO_2$ feedstock material, which contains octamethylcyclotetrasiloxane D4 as a main component,
 (b) vaporizing the liquid $SiO_2$ feedstock material into a feedstock material vapor,
 (c) converting the feedstock material vapor into $SiO_2$ particles,
 (d) depositing the $SiO_2$ particles on a deposition surface so as to form a porous $SiO_2$ soot body,
 (e) vitrifying the porous $SiO_2$ soot body so as to form the synthetic quartz glass,
  wherein the liquid $SiO_2$ feedstock material contains additional components comprising a D3 component consisting of hexamethylcyclotrisiloxane D3 or a linear homolog thereof with a weight fraction mD3, a D6 component consisting of dodecamethylcyclosiloxane D6 or a linear homolog thereof with a weight fraction mD6, and a D7+ component consisting of tetradecamethylcycloheptasiloxane D7 and/or hexadecamethylcyclooctasiloxane D8 or linear homologs of D7 and/or D8 with a weight fraction mD7+, wherein a weight ratio mD3/mD6 is in a range between 0.5 and 500 and the weight fraction mD7+ is at least 20 wt. ppm, and
  wherein providing the liquid $SiO_2$ feedstock material according to method step (a) comprises:
   providing a first mixture of polyalkylsiloxanes in which D3, D4, D5, D6 and the linear homologs thereof account for at least 99.99 wt. %,
   providing a second mixture of polyalkylsiloxanes in which D7 is present in an amount of at least 40 wt. %, and
   producing a blend from the first and second mixture of polyalkylsiloxanes prior to or during the vaporization according to method step (b) in a mixing ratio such that the blend contains D7 and/or D8 and or linear homologs of D7 or D8 such that the blend has a second weight fraction of D7 and/or D8 and/or linear homologs of D7 or D8 of at least 20 wt. ppm in the blend.

2. The method according to claim 1, wherein the ratio mD3/mD6 is in a range between 1 and 200.

3. The method according to claim 1, wherein the weight fraction mD7+ is in a range between 30 and 100 wt. ppm.

4. The method according to claim 1, wherein the sum of the weight fractions mD3+mD6 is in a range between 200 and 20.000 wt. ppm.

5. The method according to claim 1, wherein mD3 is in a range between 200 wt. ppm and 15,000 wt. ppm, and that mD6 is in a range between 50 wt. ppm and 2,000 wt. ppm.

6. The method according to claim 1, wherein the weight ratio mD3/(mD6+mD7+) is in a range between 0.3 and 150.

7. The method according to claim 1, wherein said vaporizing composes the steps of:
 heating the liquid $SiO_2$ feedstock material,
 introducing the heated $SiO_2$ feedstock material into an expansion chamber, so that at least a first part of the heated $SiO_2$ feedstock material vaporizes due to a pressure drop, mixing the SiO$_2$ feedstock material with a heated diluent, so that at least a second part of the heated SiO$_2$ feedstock material vaporizes due to a decrease in the dew point.

8. The method according to claim 7, wherein introducing the heated SiO$_2$ feedstock material into the expansion chamber comprises an injection phase in which the heated SiO$_2$ feedstock material is atomized in liquid form into droplets, the droplets having a mean diameter of less than 5 µm.

9. The method according to claim 7, wherein the droplets contact the heated diluent in the form of a hot carrier gas in the expansion chamber, which is kept at a temperature in a range of 150° C. to 230° C.

10. The method according to claim 7, wherein, during introduction of the heated SiO$_2$ feedstock material into the expansion chamber, a concentration detector measures a composition of the heated SiO$_2$ feedstock material.

11. The method according to claim 1, wherein the SiO$_2$ particles are deposited on the deposition surface according to method step (d) wherein the feedstock material vapor is supplied to a plurality of deposition burners arranged in a burner row, which are moved jointly and reversingly along the deposition surface.

12. The method according to claim 1, and further comprising
producing an optical fiber from said synthetic quartz glass.

13. A method for producing synthetic quartz glass, said method comprising:
(a) providing a liquid SiO$_2$ feedstock material, which contains octamethylcyclotetrasiloxane D4 as a main component,
(b) vaporizing the SiO$_2$ feedstock material into a feedstock material vapor,
(c) converting the feedstock material vapor into SiO$_2$ particles,
(d) depositing the SiO$_2$ particles on a deposition surface so as to form a porous SiO$_2$ soot body,
(e) vitrifying the SiO$_2$ soot body so as to form the synthetic quartz glass,
wherein the SiO$_2$ liquid feedstock material contains additional components comprising a D3 component consisting of hexamethylcyclotrisiloxane D3 or a linear homolog thereof with a weight fraction mD3, a D6 component consisting of dodecamethylcyclohexasiloxane D6 or a linear homolog thereof with a weight fraction mD6, and a D7+ component consisting of tetradecamethylcycloheptasiloxane D7 and/or hexadecamethylcyclooctasiloxane D8 or linear homologs of D7 and/or D8 with a weight fraction mD7+,
wherein a weight ratio mD3/mD6 is in a range between 0.5 and 500 and the weight fraction mD7+ is at least 20 wt. ppm, and
wherein the sum of the weight fractions mD3+mD6 is in a range between 500 and 15,000 wt. ppm.

14. The method according to claim 1 wherein the weight ratio mD3/(mD6+mD7+) is in a range between 0.5 and 100.

15. The method according to claim 7, wherein introducing the heated SiO$_2$ feedstock material into the expansion chamber comprises an injection phase in which the heated SiO$_2$ feedstock material is atomized in liquid form into fine droplets, the droplets having a mean diameter of less than 2 µm.

16. The method according to claim 1, wherein D7 accounts for an amount of at least 80 wt % in the second mixture of polyalkylsiloxanes.

17. The method according to claim 1, wherein D7 accounts for an amount of at least 90 wt. % in the second mixture of polyalkylsiloxanes.

18. The method according to claim 1, wherein the sum of the weight fractions mD3+mD6 is in a range between 500 and 15,000 wt. ppm.

19. The method according to claim 13, wherein the ratio mD3/mD6 is in a range between 1 and 200.

20. The method according to claim 13, wherein the weight fraction mD7+ is in a range between 30 and 100 wt. ppm.

21. The method according to claim 13, wherein the sum of the weight fractions mD3+mD6 is in a range between 200 and 20,000 wt. ppm.

22. The method according to claim 13, wherein mD3 is in a range between 200 wt. ppm and 15,000 wt ppm, and that mD6 is in a range between 50 wt. ppm and 2,000 wt. ppm.

23. The method according to claim 13, wherein the weight ratio mD3/(mD6+mD7+) is in a range between 0.3 and 150.

24. The method according to claim 13, wherein said vaporizing comprises the steps of:
heating the liquid SiO$_2$ feedstock material,
introducing the heated SiO$_2$ feedstock material into an expansion chamber, so that at least a first put of the SiO$_2$ feedstock material vaporizes due to a pressure drop,
mixing the heated SiO$_2$ feedstock material with a heated diluent, so that at least a second part of the heated SiO$_2$ feedstock material vaporizes due to a decrease in the dew point.

25. The method according to claim 24, wherein introducing the heated SiO$_2$ feedstock material into the expansion chamber comprises an injection phase in which the heated SiO$_2$ feedstock material is atomized in liquid form into droplets, the droplets having a mean diameter of less than 5 µm.

26. The method according to claim 25, wherein the droplets contact the heated diluent in the form of a hot carrier gas in the expansion chamber, which is kept at a temperature in a range of 150° C. to 230° C.

27. The method according to claim 24, wherein, during introduction of the heated SiO$_2$ feedstock material into the expansion chamber, a concentration detector measures a composition of the heated SiO$_2$ feedstock material.

28. The method according to claim 13, wherein the SiO$_2$ particles are deposited on the deposition surface according to method step (d) wherein the feedstock material vapor is supplied to a plurality of deposition burners arranged in a burner row, which are moved jointly and reversingly along the deposition surface.

29. The method according to claim 13, and further comprising producing an optical fiber from said synthetic quartz glass.

30. The method according to claim 13 wherein the weight ratio mD3/(mD6+mD7+) is in a range between 0.5 and 100.

31. The method according to claim 24, wherein introducing the heated SiO$_2$ feedstock material into the expansion chamber comprises an injection phase in which the heated SiO$_2$ feedstock material is atomized in liquid form into fine droplets, the droplets having a mean diameter of less than 2 µm.

* * * * *